(12) United States Patent
Schmid et al.

(10) Patent No.: US 6,650,528 B2
(45) Date of Patent: Nov. 18, 2003

(54) IGNITION DEVICE FOR A SAFETY SYSTEM

(75) Inventors: Gunther Schmid, Götzis (AT); Martin Schmid, Frastanz (AT)

(73) Assignee: Hirschmann Austria GmbH (AT)

( * ) Notice: Subject to any disclaimer, the term of this patent is extended or adjusted under 35 U.S.C. 154(b) by 46 days.

(21) Appl. No.: 09/818,948

(22) Filed: Mar. 28, 2001

(65) Prior Publication Data
US 2002/0001162 A1 Jan. 3, 2002

(30) Foreign Application Priority Data

Mar. 28, 2000 (DE) .......................... 100 15 085
Mar. 9, 2001 (DE) .......................... 101 11 809

(51) Int. Cl.$^7$ .............................. F23Q 21/00; F23Q 7/02
(52) U.S. Cl. ...................................... 361/248; 280/734
(58) Field of Search .................... 361/248; 280/734, 280/736

(56) References Cited

U.S. PATENT DOCUMENTS

| | | | | |
|---|---|---|---|---|
| 4,213,635 A | * | 7/1980 | Inokuchi et al. | 280/737 |
| 4,530,516 A | * | 7/1985 | Adams et al. | 280/741 |
| 4,722,551 A | * | 2/1988 | Adams | 280/736 |
| 5,100,170 A | * | 3/1992 | Mihm et al. | 280/735 |
| 5,152,549 A | * | 10/1992 | Aird | 280/728 |
| 5,607,328 A | * | 3/1997 | Joly | 439/852 |
| 5,876,062 A | * | 3/1999 | Hock | 280/736 |

FOREIGN PATENT DOCUMENTS

AT        000 522 U1        3/1994

* cited by examiner

Primary Examiner—Gregory J. Toatley, Jr.
Assistant Examiner—Z Kitov
(74) Attorney, Agent, or Firm—Fulbright & Jaworski, LLP

(57) ABSTRACT

A safety system ignition device (1) having an igniter housing (3), an open housing (9), and an ignition element (2) with a; least two contact lugs (7 and 9) that are positioned in the open housing (9). Disposed from and into the ignition housing are at least two connecting leads (4 and 5) that arc connected to conductors (10) that also arc connected to contact lugs (7 and 8). The open housing is positioned in the igniter housing.

15 Claims, 3 Drawing Sheets

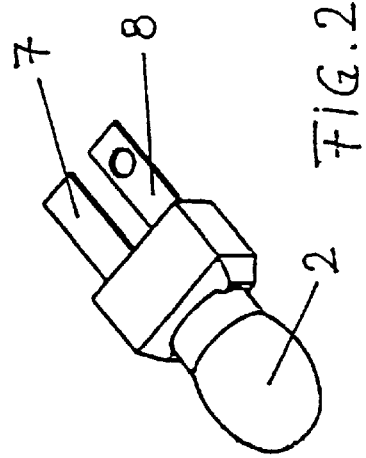
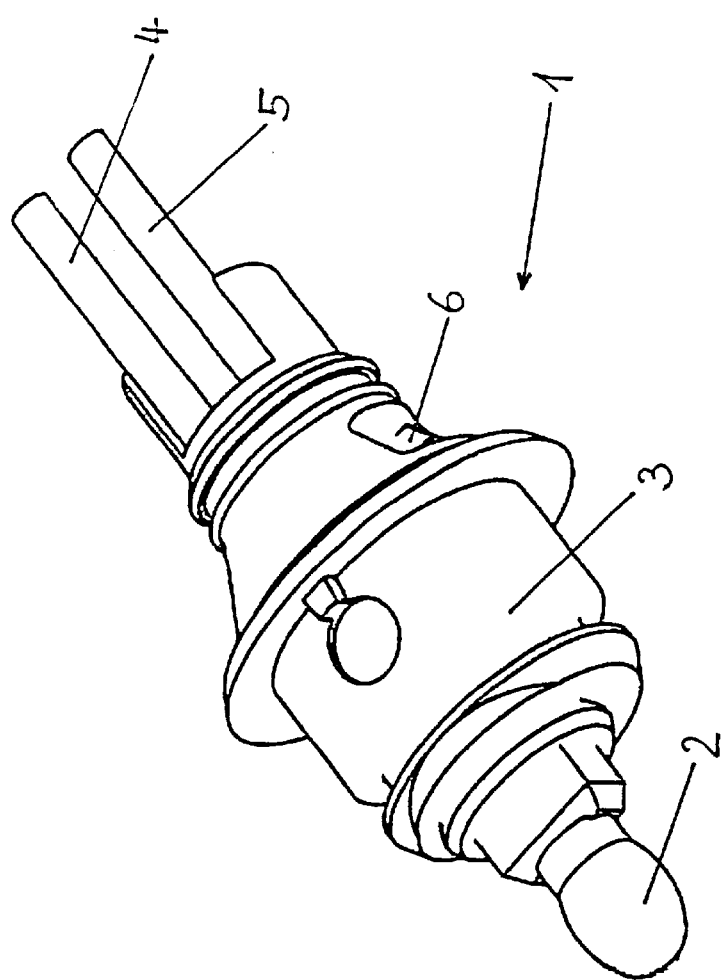

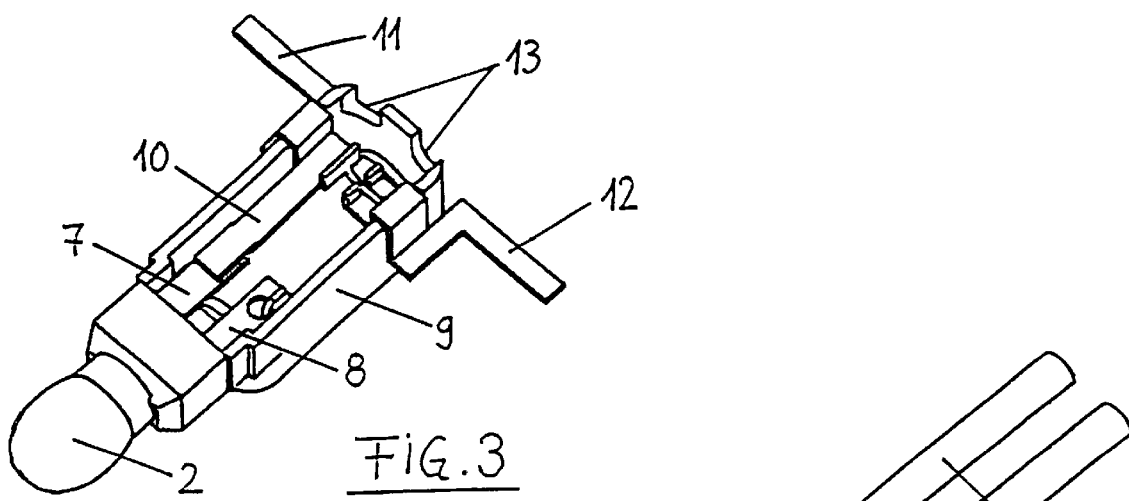
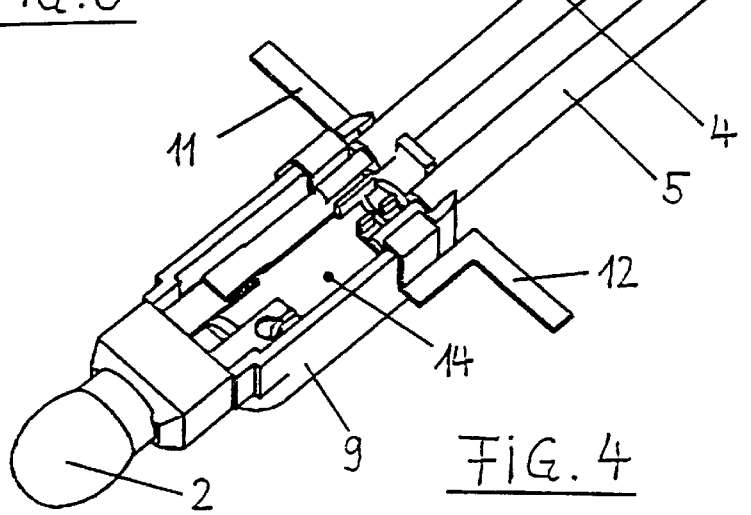
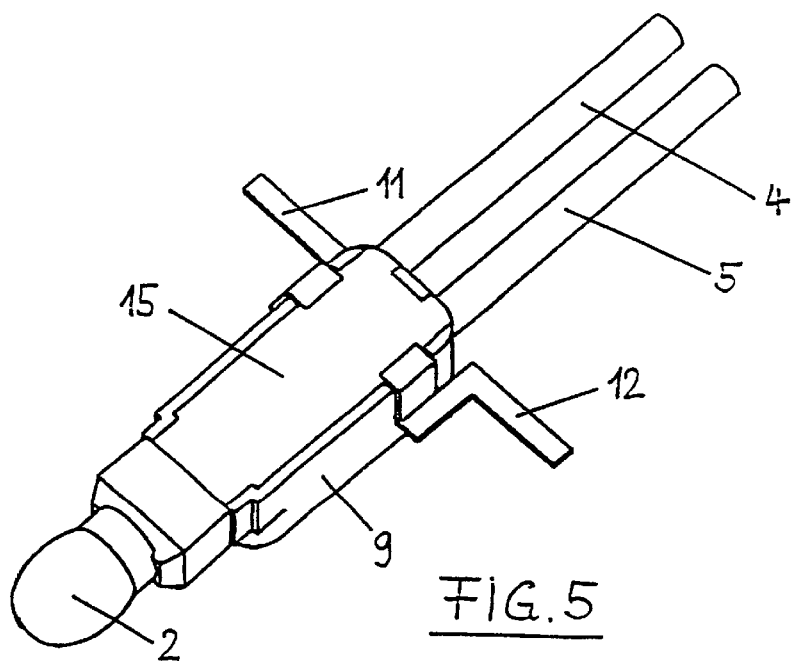

IGNITION DEVICE FOR A SAFETY SYSTEM

BACKGROUND OF THE INVENTION

Field of the Invention

The present invention relates to an ignition device for a safety system. More particularly, the present invention relates to an ignition device for a safety system for an air bag or a seat belt tightener of a motor vehicle.

AT 000 522 U1 discloses a driver for restraint systems in motor vehicles. The restraint consists of a housing with a cylinder in which a piston is movably disposed. The piston is forced out of the cylinder when a working chamber of the housing has been filled with pressure by the ignition of a propellant charge. The propellant charge is disposed in a portion of the housing which is separated from the working chamber by a so-called "bursting bottom." Within the propellant charge, an ignition charge is present which, when the ignition charge has been fired, explodes the propellant charge.

The propellant charge, in which the ignition charge is concealed, is housed in a portion of the housing which is separated from this portion of the housing by a spacer sleeve. The ignition charge is connected by very thin leads to a control device. The portion of the housing in which the propellant charge is contained is closed by a cap.

Such prior art systems suffer from the disadvantage that they involve a very complicated construction. Moreover, the assembly of the entire ignition device is extremely costly, since many individual assembly steps must be performed by hand. Another disadvantage is that these process steps cannot be automated, or only automated ax very high, that is, prohibitive cost due to the indefinable position of the leads and the positioning of the ignition charge in the propellant charge. Furthermore, the testing of the ignition device suffers from the disadvantage that it can only be performed with the entire driving apparatus of the restraint system. Accordingly, this process step is also quite costly.

As disclosed in AT 000 522 U1, certain measures have been undertaken to prevent accidental ignition. However, another disadvantage of this driving device for restraint systems is that, despite the use of a cap, the propellant charge and the ignition charge (including the electrical leads) cannot be protected completely from environmental influences, especially moisture. As will be appreciated by one of ordinary skill in the art, if moisture penetrates into the propellant charge, its operation is no longer guaranteed—this is unacceptable in safety systems.

The present invention overcomes these disadvantages and offers new advantages as well.

SUMMARY OF THE INVENTION

According to the invention there is provided an ignition device for a safety system, such as an air bag or a safety seat belt tightener for a motor vehicle, including an igniter element which can be ignited through connecting means, such as connecting leads, wherein the ignition element is disposed and preassembled with the connecting means in an igniter housing.

According to one object of the invention, the ignition element with the connecting means, preferably connecting leads, are disposed and preassembled in an igniter case. Preferably, a preassembled unit is available which can be tested for its functionality before its installation. Moreover, it is possible to preassemble this ignition device independently of the safety system, such as the place where the safety system is installed. Accordingly, with regards to production, greater flexibility is provided since the manufacturer of the ignition device does not necessarily have to be the manufacturer of the safety system. Furthermore, one advantageous feature of the invention is that if the ignition device has been examined for proper operation, the ignition device can be installed in the propellent charge in the safety system without further examination.

According to the invention, the ignition element may be a triggering element for electrically actuated safety devices (on a pyrotechnic basis), such as the safety devices, especially air bags or seat belt tighteners, for motor vehicles. According to the invention, the ignition element may be dipped ignition heads as well as igniters in glass/metal form or the like.

In accordance with another aspect of the invention, the ignition element bears connecting lugs. In accordance with this aspect of the invention, the use of connecting lugs allows fastening of the ends of the connecting leads directly to the connecting lugs, preferably by soldering or welding. Alternative, in some cases a mechanical bond, such as crimping, may also be used.

In accordance with another aspect of the invention, at least one of the connecting lugs of the ignition element is connected by electrically conductive connecting means, such as stampings, to one of the terminals, especially one end of a connecting lead. Thus, the area between the point of installation of the ignition element in the igniter housing and the point of installation of the ends of the connecting means in the ignition housing can be bridged if this is necessary. As will be appreciated by one of ordinary skill in the art, through the use of stampings as electrically conductive connecting means, it is possible to automate the assembly process as well as the subsequent wiring since the stampings are rigid and thus provide precise positioning with respect to the other components (such as the igniter and connecting leads). Furthermore, it will be appreciated that it is possible to replace the electrically conductive connecting means, i.e, the stamping, with an electronic component. In accordance with one aspect of the invention, there is a coil or choke by means of which misfiring resulting from voltages or currents or line-bound radio frequency waves can be dissipated. Alternatively, instead of chokes or coils, components such as condensers, varistors or the like can also be used. Advantageously, SMD components can be used for compactness. According to another feature of the invention, the components can also be alternatively or additionally made parallel to the connecting means.

As will be appreciated by one of ordinary skill in the art, the use of stampings as electrically conductive connecting means thus has the advantage that the stampings can be delivered automatically and further processed at the same time the electrical contact is produced between the components involved.

According to another aspect of the invention, at least one connecting means, preferably one of the stampings, can be configured as an electrode. The stamping, or several stampings, configured as electrodes are brought out of the igniter housing to form (with the housing of the safety system) a spark gap through which voltages can be carried away which otherwise, if not removed, would result in triggering the igniter. Thus the use of a stamping as an electrode father improves compactness while simultaneously improving functionality.

In accordance with another aspect of the invention, at least the igniter, the connecting means (stampings) and the ends of the connecting means are arranged in an open housing, such as a half shell. In this open housing, which can also be automatically supplied, the positions of the igniter, the connecting means and the ends of the connecting means are provided, so that, after the components are placed in the open housing, the position of the components involved is preset and the contacting can be automated.

In accordance with another aspect of the invention, at least one of the connecting means, preferably the stampings, is arranged in an injection-molded housing. Preferably, the stampings are fixed in position and then the housing is made by an injection molding process, or other suitable process, whereby after the injection, a preassembled unit is the result. Preferably, this component can be delivered by automation to the next process step and processed further. For example, in the next process step, the insertion and connection of electronic components to the stampings may be performed. Also, as will be appreciated by one of ordinary skill in the art, the injection-molded housing is an open housing, so that the stampings are accessible for the insertion and connection of the components.

After the components have been inserted and connected, the open housing must be closed. According to one aspect of the invention, it is possible to close the housing with a potting composition which has the advantage that the process can also be automated, thereby resulting in a reliable electrical insulation of the components. Furthermore, the potting composition results in good protection of the electrical components against environmental influences, whereby malfunctions or outright failure due to moisture can be avoided. Moreover, short circuits should not develop since no electrically-conductive particles can penetrate into the housing and since components within the housing cannot come into contact due to vibration. The components inside of the housing are thus insulated electrically from one another. Additionally, by the use of an open housing and subsequent potting the rigidity of the entire system is definitely increased. Another advantage lies in the fact that the housing previously open and now sealed with the potting composition can continue to be processed by automation without problems.

Alternatively, it is possible for the open housing to be closed with a matching cover. If the cover has as its inner contours the external contours of the open housing, including the components involved, potting can be dispensed with. However, if this is not the case, i.e., there are still gaps between the inside contour of the cover and the outside contour of the open housing with its components, filling with a potting composition is possible. As will be appreciated by one of ordinary skill in the art, the same advantages may be realized using the matching cover as in the case of filling the open housing with a potting compound.

In both alternatives, there is an additional advantage, wherein by using a housing/potting compound or housing/cover (with potting compound in some cases), the ends of the connecting means are mechanically locked tight, resulting in better strain relief. Furthermore, greater watertightness (lengthwise) may be obtained. Also, since the potting compound also envelops the connecting lugs and parts of the ignition element, the seal may be improved.

After the housing has been closed, it is surrounded by the igniter housing. The igniter housing may consist of at least two housing halves into which the closed housing with the ignition element and its connecting leads is inserted. Alternatively, it is possible to encase the closed housing with the ignition element (and its connecting leads) and the electrode by injection molding, wherein the igniter housing results from the injection molding. If the igniter housing is created by encasing it by injection molding, the rigid basic structure again produces an advantage since neither the ignition element nor the accompanying components (stampings etc.) can be damaged or impaired in their operation. Due to the basic structure of the sealed, formerly open housing, it is also possible to insert this basic structure automatically into the injection molding die. Surrounding the sealed housing with the igniter housing also helps ensure the sealing of the entire structure. Preferably, the external contours of the igniter housing are also configured such that automated further processing, such as testing and installation in the safety system, is possible.

An ignition device according to the invention, and various process steps for its manufacture, are described below with the aid of an enabling description of a presently preferred embodiment and with the aid of the figures. However, the invention should not be viewed as being limited to this embodiment.

BRIEF DESCRIPTION OF THE DRAWINGS

FIG. 1 shows an embodiment of a completed ignition device according to the invention;

FIG. 2 depicts an ignition element at the start of assembly according to the invention;

FIG. 3 depicts the ignition element of FIG. 2 having been inserted in an open housing according to the invention;

FIG. 4 depicts the ignition element of FIG. 3 having connecting leads attached thereto according to the invention;

FIG. 5 depicts the ignition element of FIG. 4 having a potting composition applied thereto according to the invention;

DESCRIPTION OF THE PREFERRED EMBODIMENTS

Figure 6:
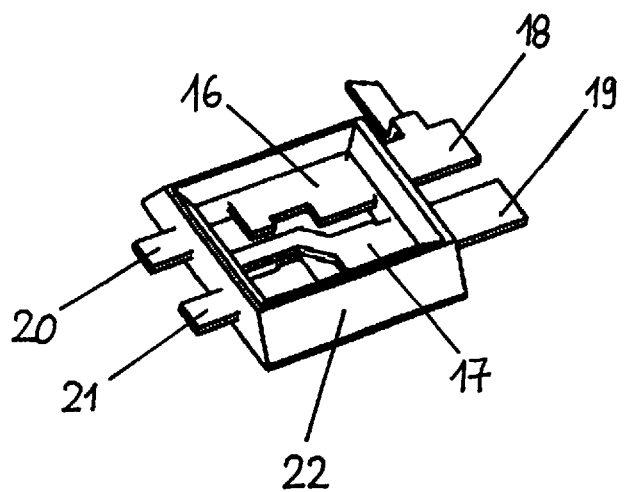
FIG. 6 depicts an alternative embodiment of a housing for an ignition device according to the invention.

FIG. 1 shows an ignition device 1 which can be manufactured and tested as a preassembled unit. This ignition device 1 is installed as a preassembled unit at the appropriate place in the safety system of the air bag or safety seat belt tightener or the like in the vehicle.

The ignition device 1 comprises an ignition element 2 to which an electrical pulse can be delivered in order to explode a propellant charge (here not shown) of the safety system. The system and the action of the propellant charge is not essential to the present invention, so that description is unnecessary.

The ignition element 2 rests on the front end of an igniter housing 3 with which the ignition device 1 can be installed in a housing, also not shown, of the safety system. Connecting leads 4 and 5 through which the ignition element 2 receives its pulse, are brought out of the igniter housing 3 at the opposite end of the latter, but can also brought out of this igniter housing 3 at any other place. It is also shown in FIG. 1 that an electrode 6 (or several) protrudes from the igniter housing 3, and is at a certain distance from the housing after installation therein, so that a spark gap is formed between electrode 6 and the housing and any flashover can take place within it if, due to static charges, voltages are produced between the housing and the connecting leads 4 and 5. This bleeding off of the static charge has the advantage that it prevents accidental firing of the ignition element 2.

The external contours of the igniter housing 3 are selected such that they permit mechanical handling of the ignition device 1, so that the ignition device 1 can be inserted and fixed in the housing of the safety system without problems, and in addition offers protection against any kinking of the connecting leads 4 and 5.

FIG. 2 shows the configuration of the ignition element 2 which consists of a head with the ignition charge and contact lugs 7 and 8 for electrical connection. Such an ignition element 2 can be premanufactured and delivered by automation to the next working step on account of the stiff connecting lugs, without problems.

FIG. 3 shows as the next step the insertion of the ignition element 2 into an open housing, which is configured as a half-shell 9. Stampings 10 to 12 are then inserted into the half-shell 9 and then provided for one thing the connection between the contact lugs 7 and 8 and the ends of the connecting lines 4 and 5, and furthermore form the electrodes. The outwardly projecting stampings 11 and 12 form the later electrodes 6 which protrude from the igniter housing 3. In FIG. 3 it is shown how the stamping 10 is attached to the contact lug 7 as a connecting means, and stamping 11 is connected as a later electrode 6. Nothing is as yet connected to contact lug 8, while stamping 12 is tightly held (the same as stamping 11) to the half-shell 9 due to its geometric shape. Alternatively, before the stampings are inserted, an electronic component (such as a choke) can be inserted.

By this configuration the stampings and other involved components (especially stamping 10 and thus also the ignition element 2) are effectively held tightly in the half-shell 9, so that they can be connected thereafter. The half-shell 9 additionally has a notch 13 to accommodate each of the ends of the connecting leads 4 and 5.

FIG. 4 shows the next working step, and it can be seen that the ends of the connecting lines 4 and 5 have been embedded in the notches 13 such that the electrically conductive ends of the connecting lines 4 and 5 can make contact with the correspondingly configured parts of stampings 11 and 12. Before connecting the lead 5 a rod core choke 14 is inserted between the connecting lug 8 of ignition element 2 and the stamping 12 and is also connected. It is also possible first to insert the rod core choke 14 (and/or other components) and thereafter the stampings; then the connections are made.

FIG. 5 shows that the system produced by automation as shown in FIG. 4 is provided with a potting composition 15. This potting composition 15 can also be injected by automation into the open half-shell 9 and increases the strength and provides protection against environmental influences, the lengthwise water-tightness along the connecting leads 4 and 5 toward the ignition element 2 is especially pointed out. This lengthwise water-tightness is created by the fact that a portion of the covering of the connecting leads 4 and 5 which is held in the notches 13 is also enveloped by the potting composition 15.

The arrangement shown in FIG. 5 can likewise be passed by automation to the next working step, wherein this arrangement is embedded in the igniter housing 3 by injection molding or is inserted into an appropriately configured igniter housing 3. In this case too it is conceivable that the igniter housing 3 consists of two or more parts which accommodate the system according to FIG. 5 and are then assembled together with an additional potting composition.

An ignition device as shown in FIG. 1 is thus produced.

Figure 7:
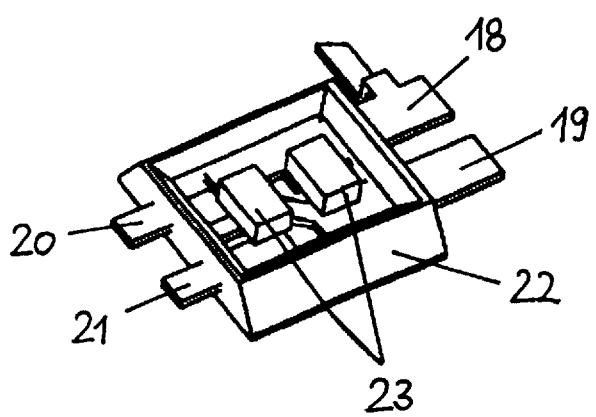
FIG. 7 depicts the housing of FIG. 6 having electronic components inserted therein according to the invention.
Figure 8:
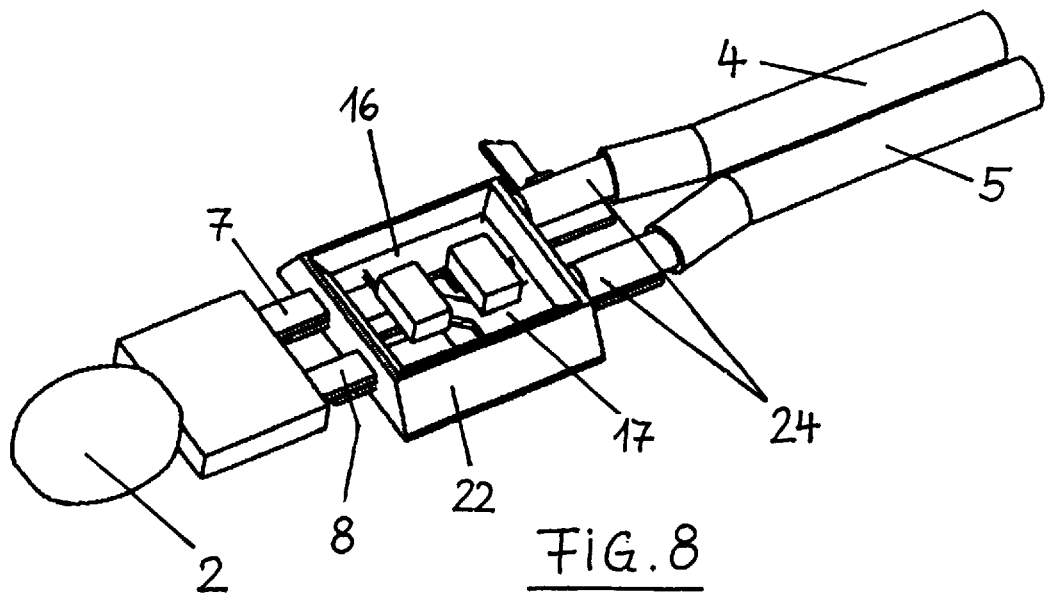
FIG. 8 depicts the housing of FIG. 7 having the ignition element and connecting leads attached thereto according to the invention.

In FIGS. 6 to 8 are shown as alternative process steps for the manufacture of the ignition device, which are similar to the process steps shown and described in FIGS. 3 to 5.

FIG. 6 shows the presence of stampings 16 and 17 which have at their ends connecting lugs 18 and 19 for the connecting leads 4 and 5 as well as connecting lugs 20 and 21 for the contact lugs 7 and 8 of the ignition element 2. For example, on appropriate connecting lags 18 to 21, the stampings 16 and 17 can be fixed in position in order to produce a housing 22 which at least partially surrounds the stampings 16 and 17 and is open on top, by embedding them by a plastic injection molding process or other appropriate method.

FIG. 7 shows the next process step in which the unit shown in FIG. 6 is provided with electronic components 23 which can be fed automatically to the embedded housing 22. After the electronic components are delivered they are placed in contact with the stampings 16 and 17 in an electrically practical manner (for example by parallel connection).

FIG. 8 shows the process step next following, in which the connecting lugs 18 and 19 of stampings 16 and 17 are connected to the stranded ends of the connecting leads 4 and 5. Connecting the lugs 7 and 8 of the ignition element 2 to the connecting lugs 20 and 21 is performed in the same manner. After this is done, and before the embedded housing 22 is closed, an electrical functional test can take place. If such a functional test is not made or has given a positive result, the embedded housing 22 can be closed or it can be delivered by automation while still open, to the next process step. In this step, the system shown in FIG. 8 is encased by the igniter housing 3 (FIG. 1) or inserted into an appropriately configured igniter housing 3. Thus too an ignition device as shown in FIG. 1 is made.

In addition to the advantage already described, this ignition device has the additional advantage that it is possible to test the ignition device 1 for its electrical functionality, regardless of the length of the connecting leads 4 and 5 and the design of the ignition element 2 and of the integrated components, by means of the two stampings 11 and 12 protruding from the igniter housing. For it has been found that the safety system (the housing with the integrated ignition device) and the controlling device by which the triggering pulse is produced according to specific conditions, are spatially separated from one another. It would still be possible to test the functionality of the ignition device through the connecting leads 4 and 5. But this interferes with automatic testing, since the ends of the connecting leads 4 and 5 have to be manually connected to a test unit. Due to the arrangement of electrodes 6 in the igniter housing 3, this unit can be placed into a corresponding socket of the test unit, or the two electrodes can be tapped in order to perform the test.

As an alternative to the use of individual connecting leads 4 and 5, sheathed conductors, ribbon conductors or film conductors can be used. It is also conceivable to use, instead of connecting leads, terminal pins which are parts of a plug or socket. In this case it might be an idea to have the igniter housing 3 with the connecting pins form the plug or the socket.

What is claimed is:

1. An ignition device for a safety system comprising:

an igniter housing;

an ignition element having at least two contact lugs, said contact lags disposed inside said igniter housing; and at least two connecting means for connecting to said contact lugs and for connecting to at least two connecting leads disposed from and into said igniter housing;

wherein the interconnected ignition element, contact lugs, connecting means and connecting leads are adapted to transmit an ignition signal to ignite said ignition element.

2. The ignition device according to claim 1, further comprising at least one of said contact lugs of the ignition element being electrically-conductively connected to an electrode.

3. The ignition device according to claim 2, wherein said electrode is disposed to extend outside said igniter housing.

4. The ignition device according to claim 1, wherein said ignition element is disposed in an open housing having a half-shell configuration, and said connecting means are disposed in said open housing.

5. The ignition device according to claim 4, wherein said open housing is formed by injection molding.

6. The ignition device according to claim 4, wherein said open housing is filled with a potting composition.

7. The ignition device according to claim 4, wherein said open housing is filled with a potting composition and a cover is disposed on the potting composition.

8. The ignition device according to claim 1, further comprising at least one electrical component disposed to be in electrical contact with at least one of said connecting means.

9. A method for assembling an ignition device having an included ignition element that has at least two contact lugs comprising:

positioning said ignition element with said contact lugs in an open housing, and connecting said contact lugs to connecting means for transmitting electrical signals, said connecting means disposed in said open housing; and positioning said open housing in an igniter housing, and connecting said connecting means to connecting leads disposed in and from said igniter housing.

10. The method according to claim 9, further comprising connecting at least one of said contact lugs to an electrode, wherein said electrode is disposed to extend outside said igniter housing.

11. The method according to claim 9, wherein said connecting means are formed by stamping.

12. The method according to claim 9, further comprising injection molding said open housing in a half-shell configuration.

13. The method according to claim 12, further comprising filling said open housing in which said contact lugs and said connecting means are disposed with a potting composition.

14. The method according to claim 13, further comprising positioning a cover on the potting composition.

15. The method according to claim 9, comprising connecting at least one electrical component to at least one connecting means.

* * * * *